Nov. 17, 1970 — A. MAROSY — 3,540,091

COUPLING

Filed Dec. 9, 1968 — 3 Sheets-Sheet 1

INVENTOR
ANDRE MAROSY
BY Hauke, Kress, Gifford, & Patalidis
ATTORNEYS

Nov. 17, 1970 — A. MAROSY — 3,540,091
COUPLING
Filed Dec. 9, 1968 — 3 Sheets-Sheet 2
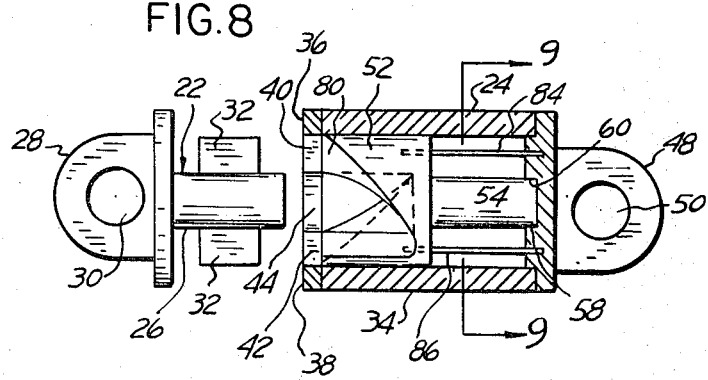
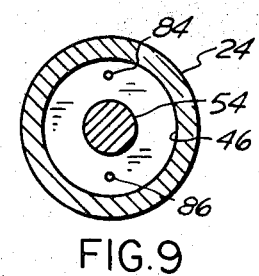
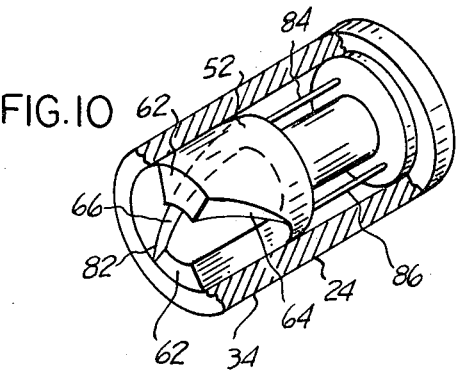
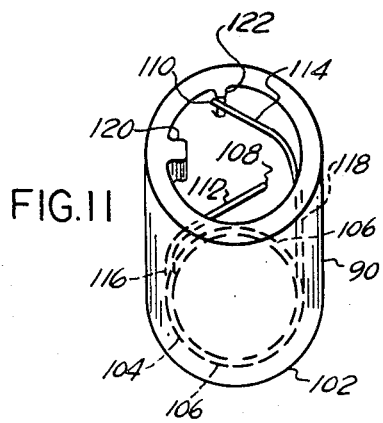
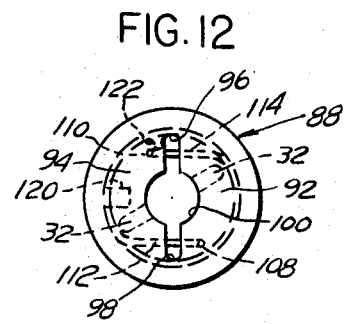
INVENTOR
ANDRE MAROSY
ATTORNEYS Nov. 17, 1970 A. MAROSY 3,540,091
COUPLING
Filed Dec. 9, 1968 3 Sheets-Sheet 3
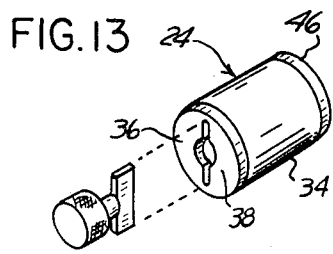
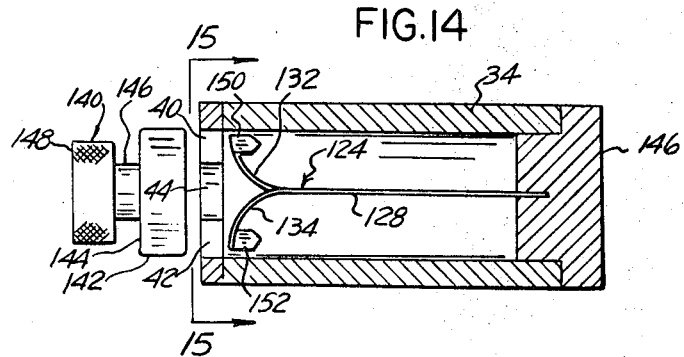
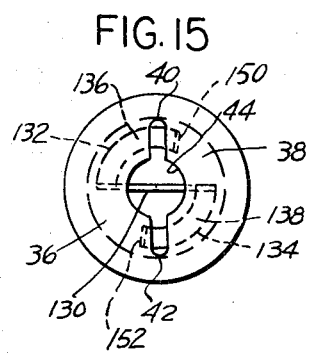
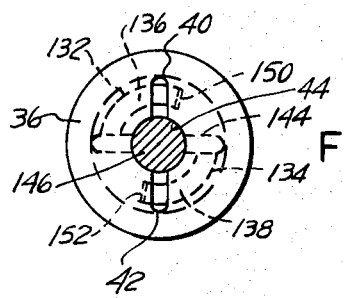
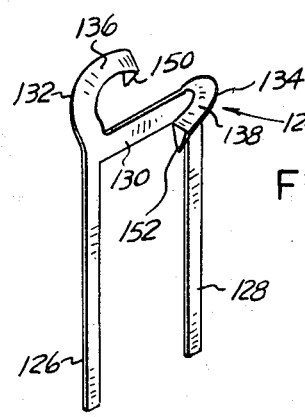
INVENTOR
ANDRE MAROSY
ATTORNEYS 3,540,091
COUPLING
Andre Marosy, 14731 Kipling Ave.,
Oak Park, Mich. 48237
Filed Dec. 9, 1968, Ser. No. 782,176
Int. Cl. A44b 17/00
U.S. Cl. 24—221                                                12 Claims

ABSTRACT OF THE DISCLOSURE

A coupling including a male member with lateral extensions at one end adapted for insertion through a slotted cover plate in a female member. As the male member is inserted into the female member the forward edges of the lateral extensions engage a pair of cam surfaces formed on a locking element that is rotatably mounted within the female member. With further insertion of the male member the pair of cams on the locking element cause the element to be rotated against a biasing element. When the male member has been inserted a sufficient distance into the female element so that the lateral extensions have cleared the cover plate, the male member is rotated about its axis by the biasing element, firmly locking the male member within the female member.

BACKGROUND OF THE INVENTION

Field of the invention

This invention relates to couplings and more particularly to that type of coupling wherein a male member is inserted into a female member and locked therein.

Description of the prior art

Various types of couplings having male and female members have been designed for situations wherein two members need to be fastened together, such as jewelry, electrical connections, or other industrial needs. One such coupling disclosed in my patent issued Nov. 22, 1966, U.S. Pat. No. 3,286,316 comprises a coupling having a male member formed from an elongated rod with a pair of lateral key-like extensions formed at one end. The extensions are displaced at 180° with respect to one another on the end of the male member so as to extend in opposite directions. The female member is formed from a tube closed at one end. The other end of the tube is closed by a slotted cover plate that has a central hole and radiating slots which are adapted to receive the male member with its lateral extensions. A slide block generally cylindrical in form is provided within the female tube and is adapted so that it may slide longitudinally but may not rotate with respect to the female tube. A coil spring is disposed between the slide block and the closed end of the tube so as to bias the slide block toward a position of abutment with the interior side of the slotted plate. The slide block has a V-groove surface in its face which abuts the slotted plate.

The male and female members are joined together by inserting the male member with the lateral extension into the slotted plate. The edges of the lateral extension abut the high edges of the V-surface, as the V-surface is aligned with its groove at right angles to the extension of the slots in the plate. This causes the slide block to be moved back against the force of the coil spring. When the lateral extensions have been fully inserted within the female tube, the male member is rotated through 90°. As it is rotated, the slide block is allowed to move toward the slotted plate as the lateral extensions slide into the groove of the V-surface.

This coupling has the disadvantage of requiring longitudinal movement of the slide block and a coil spring, both of which add to the length of the female member. If a very small coupling is desired, the reduction in length of the female member is limited by these two features.

SUMMARY OF THE INVENTION

The present invention overcomes this difficulty of the prior art by providing a coupling which eliminates the need for the coil spring and the longitudinal movement of the slide block. As in the prior art this coupling includes a female and male member.

The male member is formed from an elongated rod which has a pair of lateral key-like extensions formed at one end. The extensions are displaced at 180° with respect to one another on the end of the male member so as to extend in opposite directions.

The female member is formed from a tube which is closed at one end. The other end of the tube is closed by a slotted cover plate having a central hole and radiating slots which are adapted to receive the male member with its lateral extensions. A generally cylindrical locking element is provided within the female member adjacent the cover plate. The locking element is adapted so that it may rotate with respect to the female tube but may not slide longitudinally within the tube. A cylindrical opening on the axis of elongation extending part way through the locking element is provided on the end adjacent to the cover plate. On the same end of the locking element and surrounding the cylindrical opening is a pair of spiralling cam surfaces that extend from diametrically opposed points toward the other end of the locking element. A biasing means secured to the rotatable locking element is disposed within the tube to bias the cylindrical member toward a position wherein the upper surfaces of the cam surfaces are immediately beneath the radiating slots of the cover plate.

The male and female members are joined together by inserting the male member with the lateral extensions into the slotted plate. The forward edges of the lateral extensions abut the high surfaces of the spiral cam surfaces as the male member is first inserted into the female tube. With further insertion of the male member the cylindrical block is forced to rotate against the biasing means with the forward edges of the lateral extension sliding along the spiral cam surfaces. When the male member has been inserted a sufficient distance into the female member so that the lateral extensions have cleared the slotted cover plate, the biasing means rotates the locking element along with the male member so as to turn the lateral extensions out of alignment with the slots in the cover plate. Thus, the male member is fully locked to the female member by means of the lateral extensions and the cover plate.

The units are disengaged by rerotating the male member against the biasing means so as to align the lateral extensions and the slots in the cover plate, rotating the cylindrical member with the male member, and withdrawing the male member through the slotted plate.

A second embodiment of the invention includes a male member as previously described. The female member includes a tubular housing closed at one end. The other end is closed by a slotted cover plate as previously described. A pair of spiral shaped spring wire elements are disposed within the tubular housing. The elements which are fixedly secured to the interior surface of the closed end of the housing spiral in a clockwise direction away from the slotted cover plate and towards the closed end of the housing. The free ends of the elements rest upon the cover plate with the upper portion of one of the elements passing directly beneath each of the two slots in the cover plate.

When the male member is inserted into the female member, the forward edges of each of the extensions on the male member abuts against one of the wire elements. Further insertion of the male member causes the wire elements to yield. When the lateral extensions have cleared the cover plate, the camming action of the wire elements turns the male member in the clockwise direction, locking the male and female members together.

These types of couplings thus eliminate the need of a coil spring and longitudinal movement of the locking element. Therefore, if a very small coupling is desired, the reduction in length of the female member will not be limited by these requirements.

DESCRIPTION OF THE DRAWINGS

FIG. 8 is a side elevation view partly in section of an alternate structure, showing the male member ready to be inserted.

FIG. 9 is a section view taken on line 9—9 of FIG. 8.

FIG. 10 is a perspective view partly in section with the top removed.

FIG. 11 is a perspective view of a third alternate structure with the top removed.

FIG. 12 is a plan view of the female member of the third alternate structure.

FIG. 13 is an exploded perspective view of a fourth alternate structure of the invention.

FIG. 14 is a side elevation view partly in section, showing the male member ready to be inserted.

FIG. 15 is a plan view of the female member of the fourth alternate structure.

FIG. 16 is a plan view showing the male member in the locked position.

FIG. 17 is a perspective view of the spring and locking element.

DESCRIPTION OF THE PREFERRED EMBODIMENTS

Figure 1:
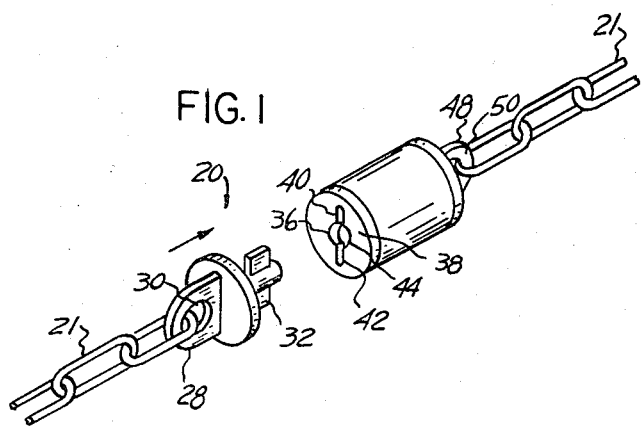
FIG. 1 is an exploded perspective view of the invention.

Referring to FIG. 1, the coupling generally indicated at 20 may be used to join two ends of chain 21. The coupling is formed of a male member 22 which has a projection 28 with opening 30 affixed to one end so as to join to the chain 21, and a female member 24 which has projection 48 with opening 50 joined to one of its ends and to the other end of the chain.

Referring to FIGS. 1 through 7, a preferred embodiment of the invention is illustrated wherein the coupling 20 is automatically locked against unfastening when the male member 22 is inserted into the female member 24. The male member 22 comprises an elongated rod 26 having a projection 28 at its outer end. The projection 28 is provided with an opening 30 for attachment to the member to be coupled.

A pair of lateral key-like extensions 32 are formed at the inner end of rod 22. The extensions 32 are generally rectangular in form and are displaced at 180° with respect to each other to extend in diametrically opposite directions.

The femal member 24 includes a tubular element 34 having a pair of arcuate flanges 36 and 38 at one end. The flanges 36 and 38 are spaced apart to define peripheral slots 40 and 42 for reception of the extensions 32 of the male member. The flanges also define a central opening 44 for reception of the rod 22 of the male member.

Circular end element 46 secured to the tube 24 for closing its other end is provided with projection 48 at its outer end. The projection 48 is provided with an opening 50 for attachment to the member to be coupled.

Figure 4:
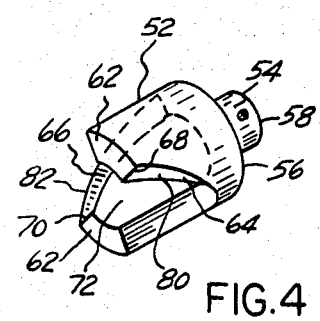
FIG. 4 is a perspective view of the locking element.

A locking element 52 is rotatably mounted within tubular member 34. As shown in FIG. 4, locking element 52 is generally cylindrical in shape. Cylindrically shaped projection 54 extends from surface 56 to locking element 52. The end 58 of projection 54 rests in cylindrically shaped hole 60 formed in member 46. Surface 62 at the other end of locking element 52 is disposed adjacent to the interior surface of flanges 36 and 38. It will thus be appreciated that locking element 52 may rotate relative to tubular member 34, but cannot slide longitudinally within member 34.

Figure 2:
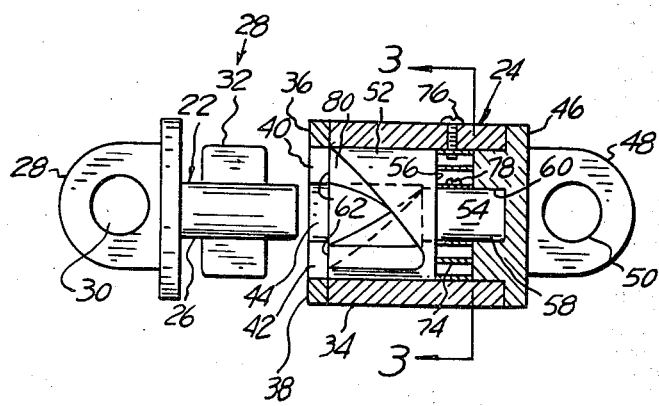
FIG. 2 is a side elevation view partly in section, showing the male member ready to be inserted.
Figure 3:
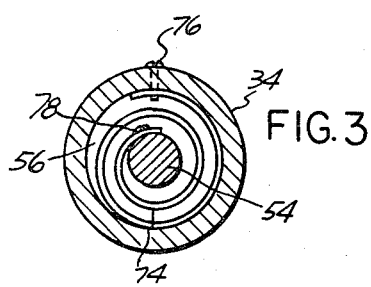
FIG. 3 is a section view taken on line 3—3 of FIG. 2.

Referring to FIGS. 2 and 4, it will be noted that one end of the locking element 52 is formed with spiralling cam surfaces 64 and 66 that extend from diametrically opposed points 68 and 70 towards the other end of the locking element. A cylindrical opening 72 is provided on the axis of elongation of locking member 52 so as to allow shaft 22 to project into element 52, as is shown in FIG. 2. A flat spiral spring 74, as shown in FIG. 3, is provided within tubular member 34 between the element 46 and surface 56 of locking element 52 wrapped around projection 54. One end of spring 74 is fixedly secured to member 34 by means of screw 76; the other end of spring 74 is secured to projection 54 by means of screw 78. Spring 74 biases locking element 52 into the position wherein the upper surfaces 80 and 82 of cam surfaces 64 and 66 respectively are directly beneath peripheral slots 40 and 42. This results in the two end surfaces 62 being positioned closely adjacent to slots 40 and 42 but on opposite sides thereof, as is better illustrated in FIG. 5. It will be noted that the cam surface 64 and 66 extend away from the slots 40 and 42 in the same rotational direction. That is, the portion of surfaces 64 and 66 directly behind slots 40 and 42 as viewed in FIG. 5 both extend in a clockwise direction away from the flanges 36 and 38.

Figure 5:
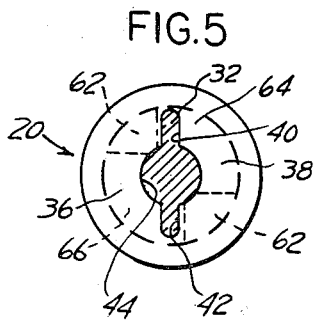
FIG. 5 is a plan view showing the male member at the point of insertion.
Figure 6:
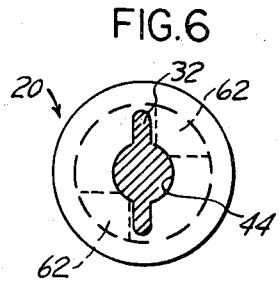
FIG. 6 is a plan view showing the male member fully inserted.
Figure 7:
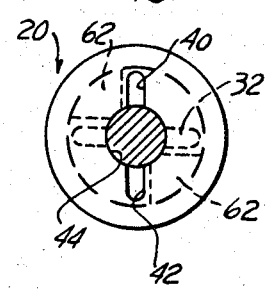
FIG. 7 is a plan view showing the male member in the locked position.

Referring to FIG. 5, it will be noted that the coupling is connected by first aligning the lateral extensions 32 of the male member 22 with the slots 40 and 42 in the end of the female member 24. The male member 22 is then inserted into the female member 24. When the extensions 32 abut against surfaces 80 and 82 of locking element 52, element 52 is rotated in a counterclockwise direction against the action of spring 74. In the fully inserted position, as shown in FIG. 6, the lateral extensions 32 have passed the end flanges 36 and 40, leaving the male member 22 free to rotate. In this position the male member 22 is turned by cam surfaces 64 and 66 and spring 74 acting upon extensions 32. As shown in FIG. 7, locking element 52 is rotated back to its original position by spring 74, while the male member 22 is rotated to a new position with the forward edges of extensions 32 resting upon the bottom of spiral cams 64 and 66. In this position extensions 32 and flanges 36 and 38 prevent the male member 22 from being withdrawn from the female member 24.

Rotation of the male member 22 from the locked position shown in FIG. 7 into a position wherein it may be removed through the slots 40 and 42, is opposed by the force of spring 74 biasing the locking element 52. Rotation of the male member 22 in the counterclockwise direction so that it may be removed from the female member requires that locking element 52 also be rotated in the counterclockwise direction against biasing spring 74. When the male member has been rotated in a counterclockwise direction and removed from the female member, locking element 52 is rotated back to its original position shown in FIGS. 5 and 7 by spring 74.

In summary, the two ends of the coupling are joined by inserting the male member 22 through slots 40 and 42 where it will be rotated by locking element 52 and spring 74, allowing locking element 52 to return to its original position as shown in FIG. 7. The units are disengaged by rotating the male element 22 in a counterclockwise direction against spring 74, and withdrawing the male member through slots 40 and 42.

FIGS. 8–10 illustrate a second preferred embodiment of the invention similar in operation to that illustrated in FIGS. 2–7 the sole difference being that spring 74 is replaced by two elongated wire elements 84 and 86. Similar members in FIGS. 8–10 represent similar parts as described in FIGS. 2–7. Flements 84 and 86 bias locking element 52 in the position shown in FIG. 8, which is the same position shown in FIG. 6.

Referring to FIG. 8, it will be noted that the coupling is connected by first aligning the lateral extensions 32 of the male member 22 with the slots 40 and 42 of the female member 24. The male member 22 with the slots 40 and 42 of the female member 24. The male member 22 is then inserted into the female member 24. When the forward edge of the extensions 32 abut against surfaces 80 and 82 of the camming surfaces 64 and 66, locking element 52 is forced to rotate in the counterclockwise direction against the action of spring elements 84 and 86. As soon as the lateral extensions 32 have passed the end flanges 36 and 38, the male member 22 is free to rotate. Male member 22 is then rotated in the clockwise direction by locking element 52, due to biasing elements 84 and 86. Locking element 52 with the male member therein is returned to its original position by elements 84 and 86. In this position the male member 22 cannot be removed from the female member 24 due to extensions 32 and flanges 36 and 38, resulting in the male and female member being firmly locked together.

In order to disconnect the coupling, the male member 22 must be turned in the counterclockwise direction, which will turn locking element 52 against biasing elements 84 and 86. When extensions 32 are aligned with slots 40 and 42 on the female element, the male element may be removed from the female element. Locking element 52 will then be returned to its original position as shown in FIG. 8 by elements 84 and 86.

FIGS. 11 and 12 illustrate a third preferred embodiment of the invention employing a male member 22 identical to that illustrated in FIG. 8.

The female member 88 includes a tubular element 90 having a pair of arcuate flanges 92 and 94 at one end. The flanges 92 and 94 are spaced apart to define peripheral slots 96 and 98 for reception of the extensions 32 of the male member. The flanges also define a central opening 100 for reception of the rod 26. The other end of tubular member 90 is closed by end cap 102.

A spring wire element 104 is disposed within female member 88. Spring element 104 is fixedly secured by any convenient means to the interior surface of end cap 102 at an intermediate portion 106 along its length. The free ends 108 and 110 of element 104 are disposed adjacent flanges 92 and 94, respectively. Element 104 slants downward from ends 108 and 110 toward end cap 102, forming cam surfaces 112 and 114 directly beneath slots 98 and 96, respectivelv. Elongated portions 116 and 118 of element 104 connect surfaces 112 and 114 with portion 106.

The coupling is connected by first aligning lateral extensions 32 of the male member 22 with slots 96 and 98 in the end of female member 88. The male member 22 is then inserted into the female member 88. When the forward edge of extensions 32 abut against the cam surfaces 112 and 114, surfaces 112 and 114 with portion 116 and 118 yield to allow the male member to be further inserted into the female member. As soon as the lateral extensions 32 have passed the end flanges 92 and 94, the male member 22 is free to rotate. In this position the male member is turned in the clockwise direction by cam surfaces 112 and 114. The cam surfaces 112 and 114 resume their original position as shown in FIG. 11, while the male member rotates in a clockwise direction with extensions 32 sliding along the camming surfaces 112 and 114. In the locked position, as shown in FIG. 12, the male member is firmly coupled to the female member by extensions 32 and flanges 92 and 94. Projection 120 formed on housing 90 prevents the male member 22 from turning too far in the clockwise direction.

The coupling is disconnected by manually turning the male member 22 in a counterclockwise direction to align the extensions 32 with the slots 96 and 98. As the male member 22 is rotated in the counterclockwise direction the forward edges of extension 32 engage surfaces 112 and 114, forcing the element to yield as the male member is turned. When the male member has been withdrawn from the female member, the spring element 104 returns to its original position as shown in FIG. 11. Projection 122 formed on housing 90 prevents the male member 22 from being turned too far in the counterclockwise direction on its removal from the female member.

FIGS. 13–17 illustrate a fourth preferred embodiment of the invention similar in operation to that illustrated in FIGS. 8–10, the difference being that locking element 52 and wire elements 84 and 86 are replaced by the single element 124. Similar numbers in FIGS. 13–17 represent similar parts as shown in FIGS. 8–10.

Element 124, as shown in FIG. 17, is comprised of a pair of elongated legs 126 and 128 extending from a mid-section piece 130. A pair of legs 132 and 134 forming the cam surfaces extend from piece 130 opposite legs 126 and 130, respectievly. Legs 132 and 134 form cam surfaces 136 and 138 respectievly, as shown in FIG. 16.

The male member 140 comprises a rectangular flat piece 142 secured at the midpoint of one of the long edges 144 to one end cylindrical member 146. Knurled handle 148 is secured to the other end of member 146.

The female member 24 includes a tubular element 34 having a pair of arcuate flanges 36 and 38 at one end. The flanges 36 and 38 are spaced apart to define peripheral slots 40 and 42 for reception of rectangular piece 142. The flanges also define a central opening 44 for reception of the member 140.

Element 124 has its two legs 126 and 128 fixedly secured in circular end element 146, with surfaces 136 and 138 positioned directly beneath slots 40 and 42, respectively.

Referring to FIG. 14, it will be noted that the coupling is connected by first aligning the rectangular piece 142 of the male member 140 with the slots 40 and 42 of the female member 24. The male member 140 is then inserted into the female member 24. When the forward edges of piece 142 abuts against surfaces 136 and 138 of element 124, element 124 is forced to rotate in the clockwise direction against the legs 126 and 128. As soon as piece 142 has passed the end flanges 36 and 38, the male member 140 is free to rotate. Male member 140 is then rotated in the counterclockwise direction by legs 126 and 128 of element 124. Element 124 with the male member therein is returned to its original position. In the fully locked position, as shown in FIG. 16, the male member 140 cannot be removed from the female member 24 due to piece 142 and flanges 36 and 38, resulting in the male and female members being firmly locked together. Flanges 150 and 152 formed on the ends of legs 132 and 134, respectievly, prevent the male member 140 from turning too far in the counterclockwise direction while in the lock position.

The coupling is disconnected by manually turning the male member 140 in a clockwise direction to align piece 142 with the slots 40 and 42. As the male member 140 is rotated in the clockwise direction piece 142 forces the legs 126 and 128 of element 124 to yield. When the male member has been withdrawn from the female member, the element 124 returns to its original position as shown in FIG. 15.

Having thus described my invention, I claim:

1. A coupling comprising: a male member including a rod having at least one lateral extension adjacent one end thereof; and a female member including a tubular housing, an end closure on one end of the housing having a slot formed therein to receive the end of the female member including the lateral extension cam means supported within the tubular housing adjacent the interior side of said end closure for rotational motion about the axis of the housing between first and second positions, said male member and cam means being formed so as to urge rotation of the cam means to said second position on insertion of said male member into said female member, and sping means for biasing said cam means towards said first position.

2. The coupling as defined in claim 1, wherein said cam means includes a cylindrical element rotatably mounted within the tubular housing with one end adjacent the interior side of said end closure, the side of said locking element adjacent to said end closure having a hollow center and an end surface portion inclined away from the end at an angle thereto.

3. The coupling as defined in claim 2, wherein said spring means biases said cylindrical element into a position with an outermost point of said inclined end surface portion in alignment with the slot in the end closure of the tubular housing.

4. The coupling as defined in claim 1, wherein said male member includes a rod having a pair of lateral extensions displaced at approximately 180° with respect to one another disposed adjacent one of its ends; and said cam means is rotatably mounted within the tubular housing with one end adjacent the interior side of said end closure, the end of said cam means adjacent to said end closure having a pair of spiral cam surfaces extending from diametrically opposed points on said end toward the other end of said cam means.

5. The coupling as defined in claim 4, wherein said spring means biases said cam means into a position with the outermost points of said cam surfaces in alignment with the slot in the end closure of the tubular housing.

6. The coupling as defined in claim 1, wherein said cam means includes a wire element mounted within the tubular housing with at least one portion adjacent the interior side of said end closure, the portion of said wire element adjacent to said end closure forming a cam surface extending from said end closure toward the other end of said tubular housing.

7. The coupling means as defined in claim 1, wherein said cam means and spring means are formed from a wire spring element mounted within the tubular housing with a first point along the length of said wire element disposed adjacent the interior side of said end closure, a first portion of said wire element extending along the length of said first element from said first point forming a cam surface extending away from said end closure toward the other end of said tubular housing, and a second portion of said wire element extends from said first point to a second point along the length of said wire element, said second portion being supported so as to yield as said male member is inserted into said female member.

8. The coupling as defined in claim 1, wherein said spring means includes a flat spiral spring with one end fixedly secured to said cam means and the other end fixedly secured to said tubular housing.

9. The coupling as defined in claim 1, wherein an end cap covers the other end of said tubular housing, and said spring means includes a plurality of elongated wire elements connected between said cam means and said end cap.

10. The coupling as defined in claim 1, wherein said cam means includes an elongated member mounted within the tubular housing with at least one portion adjacent the interior side of said end closure, the portion of said elongated member adjacent to said end closure being curved to form a cam surface extending from said end closure toward the other end of said tubular housing.

11. The coupling as defined in claim 1, wherein an end cap covers the other end of said tubular housing, and said cam and spring means are formed from a single member mounted within the tubular housing having first and second elongated flat legs extending from a central portion with their outer ends fixedly secured to said end cap, third and fourth legs extend from said central portion with their outer ends adjacent the interior side of said end closure, the portion of said third and fourth legs adjacent to said end closure being curved to form a cam surface extending from said end closure toward said end cap.

12. The coupling as defined in claim 11, wherein said male member includes a cylindrical member having a flat rectangular element secured to one end of said cylindrical member at the mid-point of one of the longer edges of said rectangular element.

References Cited

UNITED STATES PATENTS

| | | | |
|---|---|---|---|
| 2,066,956 | 1/1937 | Williams | 285—401 XR |
| 2,443,309 | 6/1948 | Dzus | 24—221 |
| 2,878,542 | 3/1959 | Summers et al. | 24—221 |

STANLEY N. GILREATH, Primary Examiner

W H. SCHROEDER, Assistant Examiner